(12) United States Patent
Foss

(10) Patent No.: US 6,336,288 B1
(45) Date of Patent: Jan. 8, 2002

(54) LIGHTED FISHING DEVICE

(76) Inventor: Daniel V. Foss, 14706 Dominica Ct., Apple Valley, MN (US) 55124

( * ) Notice: Subject to any disclaimer, the term of this patent is extended or adjusted under 35 U.S.C. 154(b) by 0 days.

(21) Appl. No.: 09/610,208

(22) Filed: Jul. 5, 2000

Related U.S. Application Data

(63) Continuation-in-part of application No. 09/329,575, filed on Jun. 10, 1999.

(51) Int. Cl.$^7$ ............................................. A01K 85/01
(52) U.S. Cl. ...................................................... 43/17.6
(58) Field of Search ................................ 43/17.5, 17.6; 362/194, 195, 203

(56) References Cited

U.S. PATENT DOCUMENTS

| | | | | |
|---|---|---|---|---|
| 2,121,114 A | * | 6/1938 | Beck ............................ | 43/17.6 |
| 3,940,868 A | * | 3/1976 | Northcutt ..................... | 43/17.6 |
| 4,085,538 A | * | 4/1978 | Jankowski ................... | 43/17.6 |
| 4,250,651 A | * | 2/1981 | Ramme ........................ | 43/17.6 |
| 4,426,803 A | * | 1/1984 | Helling ........................ | 43/17.6 |
| 4,663,880 A | * | 5/1987 | Grobl .......................... | 43/17.6 |
| 4,672,766 A | * | 6/1987 | Mattison ...................... | 43/17.6 |
| 4,741,120 A | * | 5/1988 | Cota et al. ................... | 43/17.6 |
| 4,763,433 A | * | 8/1988 | Kulak .......................... | 43/17.6 |
| 4,972,623 A | * | 11/1990 | Delricco ..................... | 43/17.6 |
| 5,070,437 A | * | 12/1991 | Roberts, Sr. ................. | 362/203 |
| 5,157,857 A | * | 10/1992 | Livingston ................... | 43/17.6 |
| 5,159,773 A | * | 11/1992 | Gentry et al. ................ | 43/17.6 |
| 5,175,951 A | * | 1/1993 | Fruchey ....................... | 43/17.6 |
| 5,299,107 A | * | 3/1994 | Ratcliffe et al. ............. | 43/17.6 |
| 5,392,555 A | * | 2/1995 | Tingey ......................... | 43/17.6 |
| 5,495,690 A | * | 3/1996 | Hunt ............................ | 43/17.6 |
| 5,515,248 A | * | 5/1996 | Canfield et al. ............. | 362/195 |
| 6,017,129 A | * | 1/2000 | Krietzman ................... | 362/194 |

* cited by examiner

Primary Examiner—Darren W. Ark
(74) Attorney, Agent, or Firm—Angenehm Law Firm, Ltd; N. Paul Friederichs; William C. Flynn

(57) ABSTRACT

A fishing device including a hook mechanism, the hook mechanism including an eyelet, a shank and a barbed hook end; a housing mechanism secured to the hook mechanism, the housing including an upper inner portion, an upper outer portion, a lower portion and an 0-ring, the upper inner portion being threadably securable to the lower portion trapping the o-ring therebetween, the upper inner portion and the lower portion cooperatively defining a cavity and the upper outer portion being snap-fittable about the upper inner portion; and mechanism for lighting disposed in the cavity, the lighting mechanism including first and second leads, a bulb, a cap portion with a contact portion and a power source, the first and second leads directly secured to the bulb, the first lead extending through the cap portion adjacent the contact portion, the second lead extending through and about the cap portion, and the first and second leads providing electrical communication between the power source and the bulb when the upper inner portion is tightened to the lower portion and interrupting the electrical communication when the upper inner portion is loosened relative to the lower portion.

3 Claims, 1 Drawing Sheet

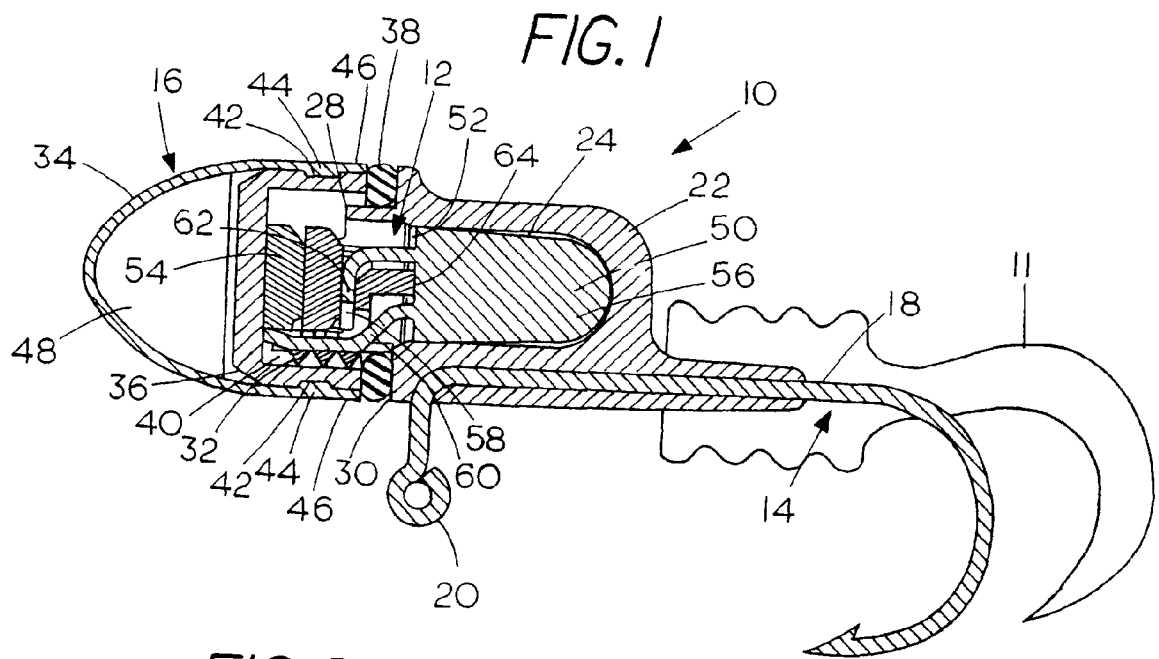
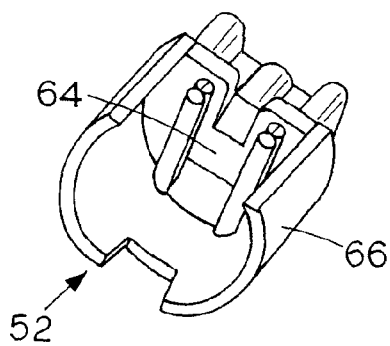
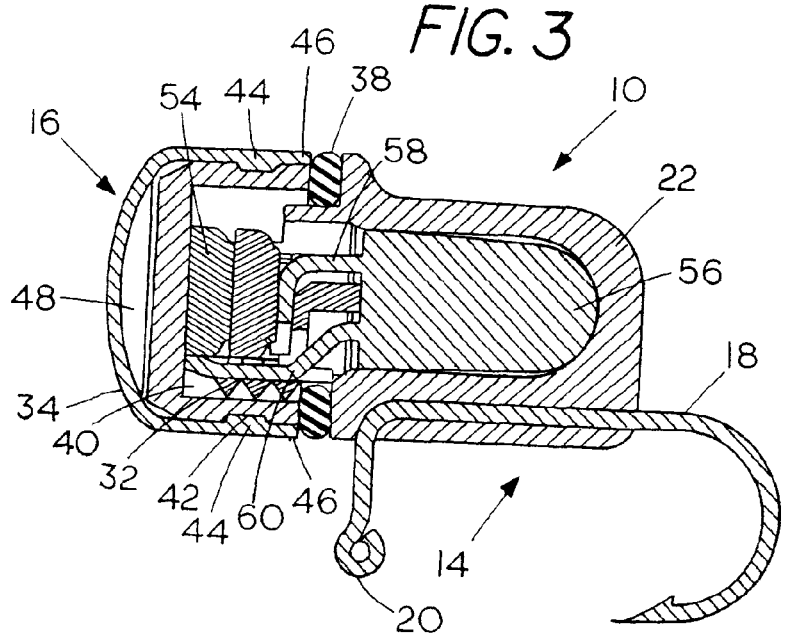

LIGHTED FISHING DEVICE

FIELD OF THE INVENTION

The present invention relates to fishing devices and more particularly to fishing devices having a light. This application is a continuation in part of application Ser. No. 09/329,575 filed Jun. 10, 1999.

BACKGROUND OF THE INVENTION

Hunt discloses an invention that has external circuitry, a mounting plate and spring clip. And a feather like material to imitate an insect.

Tingey discloses an invention that has inner circuitry, an electric flashing circuitry, a flash rate change assembly connected to the electric flashing module.

Ratcliff discloses an invention that has inner circuitry by means of an electrical power source, the electrical powered illuminating means, and the switch means is energized by the electrical power source when the switch means is closed.

Fuchey discloses an invention that has complex inner circuitry that has a circuit that is a solid state electronic configuration with oscillators and sensors with electronic controls.

Livingston discloses a fishing apparatus that has complex inner circuitry and an apparatus device to provide flashing lights and audio noises, this invention also has charging capacitors.

Delricco discloses an invention that has flexible wire head that holds a chemically lighted pellet. The pellet may consist of a plastic outer body filled with liquid or liquids. Inside the outer pellet is a thin glass pellet that will mix to produce a light radiation by squeezing outer plastic pellet and breaking the inner glass pellet.

Kulak discloses an invention that has nontransparent body with inner circuitry that has series of electrical connections that complete an electrical loop.

Coat discloses an invention that is illuiminated by chemical means of Tritium capsule, that may not be turned off after it has been illuminated.

Mattison discloses an invention that is illuninated by the means of a chemiluminescent capsule.

Jankowski discloses an invention that has an inner circuit comprising in series of a resistor, a source of emf and switch for closing and breaking the circuit.

Northcutt discloses an invention that fastened to a separate fish hook, and a power source that is separate from the lighted device and an lectrical current relayed to the light source by wires.

In the past illuminated fishing devices have either been illuminated by chemicals or in the most part by electrical voltage power sources, most with some type of inner or outer circuitry or mechanics (springs or connectors). The chemicals that have been used have either been hazardous (tritium) or they were not effective for prolonged periods of time (chemiluminescent light), and these devices were not able to be taken out of service after they have been activated. The electrical voltage power sources have either needed a larger voltage battery, with some type of inner mechanics, this did not make for a particle fishing device. And the devices that did use a small, one battery source, did so without either placing the battery in a sealed compartment, or had other important parts exposed to the elements, which made them prone to be damaged and did not affix the hooks permanently into the inventions or did not give the option for the device to be used either as submergible or flotation device. And none of the above inventions allowed for attachments to be applied to them or to be used with live bait and because of these shortcomings, it limits their ability to either be economically reproducible or practical in their applications, unlike the present invention.

SUMMARY OF THE INVENTION

The present invention is a fishing device which may include a hook mechanism, a housing and a lighting mechanism. The hook mechanism may include an eyelet, a shank and a barbed or non-barbed hook end. The hook mechanism may be directly secured to the housing.

The housing preferably includes an upper inner portion, an upper outer portion, a lower portion and an 0-ring. The upper inner portion may be threadably securable to the lower portion trapping the o-ring therebetween. When secured, the upper inner portion and the lower portion define a cavity. The upper outer portion may be snap-fit about the upper inner portion.

The lighting mechanism is preferably disposed in the cavity and may include first and second leads, a bulb, a cap portion with a contact portion and a power source. The first and second leads directly secured to the bulb. The first lead extends through the cap portion adjacent the contact portion, while the second lead extends through and about the cap portion. The first and second leads are thereby disposed to provide electrical communication between the power source and the bulb when the upper inner portion is tightened to the lower portion and interrupt the communication when the upper inner portion is loosened relative to the lower portion.

DESCRIPTION OF THE FIGURES

FIG. 1 is a cross section of a side view;

FIG. 2 is a perspective view of the cap; and

FIG. 3 is a cross section of a second embodiment.

DETAILED DESCRIPTION OF THE INVENTION

The present invention 10 is a device for fishing. As shown in its preferred embodiment, it is a jig, perhaps with dressing 11 which allows light to pass therethrough and is shaped to attract fish but may be in a plastic worm, lure, crank bait, spinner, beads or other such piece of fish attracting equipment. The device 10 may come in a wide variety of sizes shapes, appearance, colors and other modifications. The device 10 includes a mechanism 12 for lighting, which attracts fish. Component parts of this unique invention may include a hook mechanism 14, a housing mechanism 16 and the mechanism 12 for lighting. Each of these components will be discussed in serial fashion.

The hook mechanism 14 may be any style hook known in the field of fishing. The hook 14 may be a single, dual, treble or other hook combination. The hook 14 may be manufactured of a broad variety of materials such as those known and used in the field of fishing hooks and polymers of similar strength characteristics. The hook 14 may be barbed or barb less, recognizing that barbless hooks are as effective as barbed hooks, but protect fish from injury so that they may be easily caught and released. The shank 18 may be straight, curved or bent (as shown) and have an eyelet 20 for securing the hook 14 to fishing line.

The housing mechanism 16 protects the lighting mechanism 12 from water damage, while the device 10 is totally submerged. The housing mechanism 16 is a casing including a lower portion 22 a upper outer portion 34, an upper inner portion 36 and a mechanism for sealing 38. Each component will be discussed in serial fashion.

A lower portion 22 may secure about the shank 18 of the hook 14 if the hook is joined to the housing and generally define a pocket 24. This lower portion 22 is intended to be transparent or translucent, allowing light from the lighting mechanism 12 to pass therethrough, although the lower portion 22 may be opaque if another mechanism for optical communication between the light mechanism 12 and the external world is present such as through the upper housing 36. The lower portion further includes a terminal circumferential wall 28, which is inset to define a shelf 30. The circumferential wall 28 preferably includes threading 32 or other mechanism for attachment.

The upper inner portion 36 may be cap-shaped and have internal threading 40 for engaging threading 32 of the lower portion 22. The mechanism for sealing 38, preferably a rubber o-ring as shown, may be placed about the circumferential wall 28 of the lower portion 22 adjacent the shelf 30. The upper inner portion 36 may then secured to the lower portion, preferably pinching the mechanism for sealing 38 therebetween. The upper inner portion 36, mechanism for sealing 38 and lower portion 22 provide a water-tight compartment containing the lighting mechanism 12 therein. The upper inner portion 36 may further include external circumferential groove 42 for connection to the upper outer portion 34. While the preferred shapes are as shown, this invention includes other shapes and securement mechanisms that accomplish the same purpose, which is to create a water-tight cavity to hold the lighting mechanism 12. The upper inner portion 36 may be transparent or translucent for optical purposes.

The upper outer portion 34 may be aerodynamically shaped to allow the device 10 to easily move through the water. Alternatively, the upper outer portion 34 may be specifically shaped to cause the device 10 to use water and force on the fishing line to move the device 10 in a life-like manner. The upper outer portion 34 may include a circumferential projection 44 adjacent a lip 46 of the upper outer portion 34. The lip 46 defines an opening extending into a cavity 48, which cavity 48 is further defined by the remainder of the upper outer portion 34. The cavity 48 provides space for the upper inner portion 36, while the circumferential projection 44 provides the male portion of an attachment mechanism sized to be received within the circumferential groove 42.

The lighting mechanism 12 may include a bulb portion 50, a cap portion 52 and a power source 54. The cap portion 52 may have a mechanism for selectively or permanently securing the cap portion 52 from rotation or removal relative to the lower portion 22, such as adhesive, teeth, snap-fit, grooves, shaping, etc. The bulb portion 50 preferably includes a light bulb 56 directly connected to lead wire 58, 60. Lead wire 58 may extend vertically through the cap portion 52 and be bent in an "L" shape with the horizontal portion 62 selectively connectable to the power source. Beneath the lead wire 58 is a contact portion 64 of the cap 52. The contact portion 64 selectively applies pressure to the lead wire 58, pressing it into the power source 54. Lead wire 60 passes through a portion of the cap 52 to an exteneral side 66 thereof. The wire 60 may then come into contact with the power source 54. Either lead wire 58 or 60 may be positive and the other negative depending upon the selection of the manufacturer.

The upper inner portion 36, being threaded may be tightened down pressing the power source 54 and the contact portion 64 together trapping lead 58 therebetween. This tightening completes the circuit, supplying power to the light bulb 56. Loosening the upper inner portion 36 releases the pressure between the power source 54 and the contact portion 64 to interrupt the circuit and thereby turn the light off.

I claim:

1. A fishing device comprising:

a hook, the hook including an eyelet, a shank and a barbed hook end;

a housing secured about a portion of the hook, the housing including an upper inner portion, an upper outer portion, a lower portion and an 0-ring, the upper inner portion being threadably securable to the lower portion trapping the o-ring therebetween, the upper inner portion and the lower portion cooperatively defining a cavity and the upper outer portion being snap-fittable about the upper inner portion via insertion of a circumferential projection into a circumferential groove; and means for lighting disposed in the cavity, the lighting means including first and second leads, a bulb, a cap portion with a contact portion and a power source, the first and second leads directly secured to the bulb, the first lead extending through the cap portion adjacent the contact portion, the second lead extending through and about the cap portion, and the first and second leads providing electrical communication between the power source and the bulb when the upper inner portion is tightened to the lower portion and interrupting the electrical communication when the upper inner portion is loosened relative to the lower portion.

2. The device of claim 1 further comprising dressing, the dressing allowing light to pass therethrough and shaped to attract fish.

3. The device of claim 1 wherein the power source comprises at least one battery.

* * * * *